United States Patent Office 3,389,132
Patented June 18, 1968

3,389,132
METALLIFEROUS AZOMETHINE CONTAINING AZO DYESTUFFS CONTAINING AN 8-AMINO-QUINOLINE GROUP
Hans Dressler, Pitcairn, and Henry W. Pons, Lock Haven, Pa., assignors to American Aniline Products, Inc., a corporation of Delaware
No Drawing. Filed June 22, 1964, Ser. No. 377,050
4 Claims. (Cl. 260—146)

ABSTRACT OF THE DISCLOSURE

Complex azo compounds which contain a metal, such as nickel, in complex combination with a metalliferous azomethine dye derived from 8-aminoquinoline and an azo dye containing an o-hydroxyaldehyde group are provided. The compounds can be metallized directly or metallization can be carried out by incorporating the metallizing agent in the fiber to be dyed and thereafter dyeing with the non-metallized compound. The latter method is particularly desirable because of the availability of metallized polypropylene.

---

This invention relates to new azomethine dyestuffs metallized with a polyvalent metal, and the application of these dyestuffs to the art of dyeing or coloring. In one specific aspect, the invention relates to the application of new metallized azomethine dyestuffs to polyolefins, particularly polypropylene, in the form of yarn, fabric, filaments and film.

The polymers made from lower mono-alpha-olefins, particularly polypropylene, are known to have good fiber forming properties. One of the difficulties confronting the textile industry in making new fabrics from these polymers is the problem of coloration. Polypropylene and polyethylene lack the functional groups along the chain of the polymer that tend to permit dyestuffs to be absorbed or otherwise bound firmly by physical or chemical forces.

Considerable research effort has been expended in providing a satisfactory process for dyeing polyolefins. In the recently issued patent to Joseph Bianco et al., U.S. 3,128,146, there is described a method of dyeing polypropylene by immersing the polymer in an emulsified dye liquor between a temperature of 27° C. and the boiling point of the liquor. The dye liquor is prepared by dissolving a water-insoluble, oil-soluble dyestuff in an inert organic solvent. The Bianco process provides colored polyolefins which are surprisingly fast to light, fast to soaping and crocking. Unfortunately, the dry cleaning resistance of the dyed fiber is somewhat limited.

We have discovered a class of metalliferous azomethine dyes, derived from 8-aminoquinoline, which dye polymeric materials, particularly fibers, in shades ranging from yellow to violet of excellent fastness to washing and dry cleaning.

It is, therefore, an object of the present invention to provide a new class of metallized dyes, particularly useful for the dyeing of polymeric fibers, including polypropylene.

In accordance with the invention, we have discovered complex compounds which contain a metal selected from the group consisting of chromium, cobalt, copper, nickel, zinc and aluminum in complex combination with an azomethine compound having the formula:

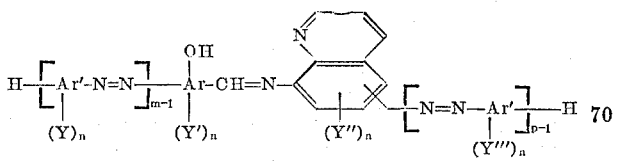

In the above formula Ar is a member selected from the group consisting of phenyl and naphthyl. The hydroxyl group in the Ar portion of the molecule is ortho- to the azomethine group. Ar' is a member selected from the group consisting of phenyl and naphthyl. $m$ and $p$ are integers having a value of 1–3 and $n$ is an integer having a value of 1–2. Y, Y', Y", and Y'" are hydrogen, lower alkyl, lower alkoxy, halo, or trifluoromethyl. The four Y substituents of the above formula are independently selected from the foregoing group; thus, each can be the same member or a different member of the group, depending upon the particular specific compound.

The parent unmetallized dyes are easily prepared by condensing equimolar amounts of azo dyes containing an o-hydroxyaldehyde structure with 8-aminoquinoline. Alternatively, equimolar amounts of arylazo-8-aminoquinoline can be reacted with aromatic o-hydroxyaldehydes, such as salicylaldehyde or 2-hydroxynaphthaldehyde, in suitable solvents at an elevated temperature.

The metallized azomethine dyestuffs of our invention are prepared by treating the corresponding non-metallized compounds with salts of chromium, cobalt, copper, nickel, zinc and aluminum. Metallization can also be carried out by incorporating the metallizing agent in the fiber to be dyed and thereafter dyeing with the non-metallized compound to form the metal complex on the fiber. This latter method is particularly desirable in view of the recent trends in the commercial dyeing of polyolefins.

Recently, an effort has been made to provide a polymer of improved dyeability by the incorporation into the polymer of a polyvalent metal, such as chromium, cobalt, copper, nickel, zinc and aluminum. The preparation of such metal-containing polymers is described in the patent to Caldwell et al., U.S. 2,984,634.

As noted above, the non-metallized intermediates of the invention can be prepared by reacting the appropriate 8-aminoquinoline with salicylaldehyde or 2-hydroxynaphthaldehyde, substituted with halo, lower alkyl, lower alkoxy or trifluoromethyl groups or with the appropriate azo dyes containing the o-hydroxyaldehyde structure.

The dyestuffs are conveniently made by heating substantially equimolar quantities of the reactants in aromatic or alcoholic solvents, such as monochlorobenzene, dichlorobenzene, trichlorobenzene, ethanol or isopropanol, under reflux conditions.

Useful metallizing agents are the halides, sulfates, acetates, cyanates and thiocyanates or chromium, cobalt, copper, nickel, zinc and aluminum. Thus, nickel chloride, nickel bromide, nickel sulfate, nickel acetate, nickel formate, cobaltous bromide, cobaltic chloride, cobaltous chloride, cobaltous acetate, cupric chloride, cupric bromide, cupric acetate, cupric lactate, chromium trichloride, chromium tribromide, chromic sulfate, chromic acetate, zinc acetate, zinc sulfate, aluminum potassium sulfate, aluminum sulfate and aluminum oxychloride are illustrative of the metallizing agents that can be employed.

To prepare the premetallized complexes 1–2 moles of the azomethine dye, corresponding to the formula shown above, is reacted with one mole of one of the metallizing agents listed hereabove in the presence of a suitable solvent, such as acetone, methyl Cellosolve, N,N-dimethylformamide, N,N'-diethylformamide, N,N'-dimethylacetamide and dimethylsulfoxide. The relative proportion of dye to metallizing agent in the final complex will vary with the relative proportion of each in the reaction mixture. To make the reaction proceed smoothly it is desirable to employ an amount of metallizing agent slightly in excess of that desired in the final product. The metallizing reaction is accomplished at an elevated temperature of 100 to 140° C. and the products are ordinarily recovered by drowning in water, followed by filtration.

As noted above, the metal complexes of the invention are conveniently prepared by reacting the azomethine dye with fiber containing the metallizing agent. Such fibers are commercially available and ordinarily they contain from 0.05 to 2 percent, preferably from 0.05 to 0.20 percent, by weight metallizing agent. The formation of the complex in situ on metal-containing polypropylene, for example, nickel- or aluminum-containing polypropylene, is accomplished by dyeing the fabric with a 0.05 to 2 percent solution of the dye of the invention in an aqueous bath adjusted to pH of 3.5 to 5.5 with an organic acid, such as acetic acid, or an inorganic acid, such as phosphoric acid. The slightly acid pH assists in the formation of the metal complex on the fiber and in the rapid development of tinctorial strength.

Dyeing is best accomplished by providing a bath comprising an aqueous dispersion containing the desired dye in the above indicated concentration. The dispersion is formed by using from 0.01 to 2 percent by weight of a conventional dispersant or emulsifying agent. Useful emulsifying agents include the alkali metal salts of alkylaryl sulfonates, the salts of sulfate esters of alkylphenoxypolyoxyethylene alkanols, long chain hydrocarbon alkali metal sulfonates, the alkali metal acylalkyl taurates, monoalkyl biphenyl monosulfonate salts, dialkylphenyl phenyl disulfonate salts, polymerized salts of alkylnaphthalenesulfonic acids, alkylsulfate salts, alkylaminealkane sulfonates, polyoxethylene alkyl ethers and thioethers, fatty alcohol ethylene oxides, polyoxethylene alkylphenols, alkylphenoxpolyoxyethylene alcohols, polyoxyethylene esters of mixed fatty and rosin acids, and the like. Because of their commercial availability, the alkali metal alkylaryl sulfonates and alkylaminealkane sulfonates are perferred.

The dyes of the invention color polypropylene in strong, full shades having excellent fastness to soaping, to dry cleaning and to light.

Our invention is further illustrated by the following examples:

Example I.—N-(o-hydroxybenzylidene)-8-aminoquinoline

To a 300 ml. flask equipped with stirrer, Dean-Stark trap, reflux condenser and thermometer there was charged 7.2 g. 8-aminoquinoline, 6.1 salicylaldehyde and 52 ml. monochlorobenzene. The reaction mixture was heated to reflux at 130° C. for four hours. The monochlorobenzene was distilled off in vacuo in 10 mm. of Hg. There was thus obtained 10.2 g. of N-(o-hydroxybenzylidene)-8-aminoquinoline.

Example II.—Dyeing of nickel-containing polypropylene

A commercially available nickel-containing polypropylene fabric was boiled with 1.0 weight percent of the dye of Example I, pasted with an alkylaryl sulfonate in an aqueous bath, and brought to pH 4–5 with acetic acid. After rinsing and drying, the fabric was found to be dyed in a pale, pastel yellow shade with excellent fastness to washing. The dry cleaning properties of the dyed fabric were tested by immersion of the fabric in perchloroethylene for a 36 hour period during which time no color was removed from the fabric. The dyeing was tested for lightfastness using the conventional accelerated testing method was a carbon arc Fade-O-Meter. Only a slight break in color occurred after forty hours exposure time.

Example III.—Nickel complex of N-(o-hydroxybenzylidene)-8-aminoquinoline

To a refluxing mixture of 2.5 g. of N-(o-hydroxybenzylidene)-8-aminoquinoline and 30 ml. of acetone was added 2.7 g. of nickelous acetate tetrahydrate in 60 ml. of 50 percent aqueous acetone and 8 ml. of 28 percent aqueous ammonium hydroxide. The mixture was stirred and refluxed for two hours, then poured into 400 ml. of water. The metallized dye was filtered and dried to give a bright yellow pigment.

Example IV.—Copper complex of N-(o-hydroxybenzylidene)-8-aminoquinoline

A mixture of 2.5 parts of N-(o-hydroxybenzylidene)-8-aminoquinoline, 50 ml. of N,N-dimethylformamide, and two parts of copper acetate monohydrate was stirred at 120° C. for four hours, then cooled to 25° C. and poured into 250 ml. of water. The suspension was boiled, filtered, and the insoluble product dried to give a greenish-yellow pigment.

Example V.—N-[2-hydroxy-5-(o-tolylazo) benzylidene]-8-aminoquinoline

To a 250 ml. three necked flask equipped with reflux condenser, stirrer and thermometer there was charged 12 g. of 5-(o-tolylazo)-2-hydroxybenzaldehyde, 7.2 g. 8-aminoquinoline and 50 ml. of isopropanol. The mixture was heated to reflux (83° C.) and held at this temperature for 3.5 hours. The mixture was stirred and cooled to 28° C. over a 2.5 hour period and allowed to stand overnight. The resulting red solid was filtered off, washed with isopropanol and dried at 85° C. to give 16.9 g. of the desired dyestuff.

Example VI.— Dyeing of aluminum-containing polypropylene

The dye of Example V was applied to commercial available nickel-containing polypropylene by the method described in Example II. The resulting dyed fabric was a brilliant orange shade having excellent dry cleaning fastness and showing only a slight break in color after twenty hours exposure in the Fade-O-Meter.

Example VII

A nine g. quantity of an o-hydroxyaldehyde disazo dye of the formula:

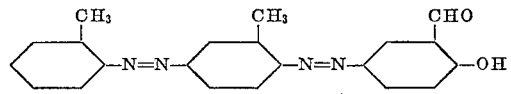

3.6 g. of 8-aminoquinoline and 50 ml. of isopropanol were charged to a 250 ml. three necked flask, heated to reflux (83° C.) and held at this temperature for 3.5 hours. The product was separated by filtration, washed with isopropanol and dried to give 10.4 g. of an azomethine dye of the formula:

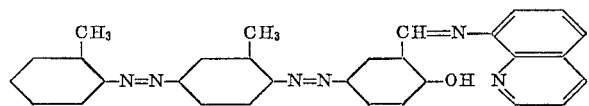

Example VIII.—Dyeing of nickel-containing polypropylene

The dye of Example VII was applied to commercially available nickel-containing polypropylene by the method described in Example II. The resulting dyed fabric was a reddish-orange shade having excellent dry cleaning fastness and showing only a slight break in color after twenty hours in the Fade-O-Meter.

Example IX.—N-[2-hydroxy-5-(2-chloro-5-trifluoromethylphenylazo)-benzylidene]-8-aminoquinoline A 15.6 g. quantity of 5 - ( 2 - chloro-5-trifluoromethylphenylazo) - 2 - hydroxybenzaldehyde, 7.2 g. 8-aminoquinoline and 50 ml. isopropanol were charged to a 300 ml. flask, heated to reflux (82° C.) and held at this temperature for 3.5 hours. The mixture was cooled and the product was separated by filtration, washed with isopropanol and dried at 85° C. There was thus obtained 19.0 g. of azomethine dye.

Example X.—Dyeing of aluminum-containing polypropylene

An aluminum stearate-containing polypropylene fabric was boiled with 1.0 weight percent of N-[2 - hydroxy-5-( 2 - chloro - 5 - trifluoromethylphenylazo)benzylidene]-

8 - aminoquinoline pasted with an alkylaryl sulfonate in an aqueous bath and brought to pH 4–5 with acetic acid. After rinsing and drying, the fabric was found to be dyed in a brilliant golden yellow shade, with excellent fastness to light and dry cleaning.

Example XI.—Dyeing of nickel-containing polypropylene

The dye of Example IX was applied to commercially available nickel-containing polypropylene by the method described in Example II. The resulting dyed fabric was a brilliant orange shade having excellent dry cleaning fastness.

Example XII.—N-(2-hydroxy-1-naphthylidine)-8-aminoquinoline

To a 100 ml. flask equipped with reflux condenser, thermometer and stirrer there was charged 8.6 g. of 2-hydroxynaphthaldehyde, 7.2 g. of 8 - aminoquinoline and 50 ml. of isopropanol. The mixture was heated to reflux and maintained at this temperature for 3.5 hours. Upon cooling to 25° C. a yellow solid precipitated which was separated by filtration, washed with isopropanol and dried at 85° C. to give 14.5 g. of the desired azomethine dye.

Example XIII.—Cobalt complex of N-(2-hydroxy-1-naphthylidene)-8-aminoquinoline

A mixture of 1.5 g. of the N - (2 - hydroxy - 1 - naphthylidene) - 8 - aminoquinoline of Example XII, 30 ml. of methyl Cellosolve, and 4 ml. of 28 percent aqueous ammonia was heated to 90–100° C. and a solution of 1.3 g. cobaltous acetate tetrahydrate in 30 ml. of hot 50 percent aqueous methyl Cellosolve was added. The mixture was stirred and heated at 100° C. for eight hours, then poured into 800 ml. of water. The metal complex was recovered by filtration, washed with water, dried, and pulverized to give a reddish orange pigment.

Example XIV.—Chromium complex of N-(2-hydroxy-1-naphthylidene)-8-aminoquinoline

A mixture of 1.5 g. of the N-(2-hydroxy - 1 - naphthylidene) - 8 - aminoquinoline of Example XII, 20 ml. of N,N' - dimethylformamide, and 1.0 g. of chromium trichloride were stirred and heated at 125–130° C. for five hours, then poured into 200 ml. of water. The precipitated product was isolated by filtration, washed well with hot water, and dried to give a red-orange metallized dye.

Example XV.—Zinc complex of N-(o-hydroxybenzylidene)-8-aminoquinoline

The zinc complex of N-(o-hydroxybenzylidene)-8-aminoquinoline is obtained by the procedure of Example XIV, substituting an appropriate quantity of zinc acetate for the chromic chloride.

Example XVI.—Dyeing of nickel-containing polypropylene

A commercially available nickel-containing polypropylene fabric was boiled with 1.0 weight percent of the dye of Example XII, pasted with an alkylaryl sulfonate in an aqueous bath, and brought to pH 4–5 with acetic acid. After rinsing and drying, the fabric was found to be dyed in a bright orange shade with excellent fastness to washing. The dry cleaning properties of the dyed fabric were tested by immersion of the fabric in perchloroethylene for a 36 hour period, during which time no color was removed from the fabric. The dyeing was tested for lightfastness using the conventional accelerated testing method with a carbon arc Fade-O-Meter. Only a slight break in color occurred after forty hours exposure time.

Example XVII

To a 50 ml. flask equipped with stirrer, agitator and reflux condenser there was charged 2.5 g. of 5-(o-tolylazo)-8 - aminoquinoline, 1.75 g. of 2 - hydroxy - 1 - naphthaldehyde and 200 ml. of isopropanol. The reaction mixture was heated to reflux and maintained at this temperature for 3.5 hours. The mixture was allowed to cool overnight and the solid was filtered off and washed at 85° C. to give 3.41 g. of an azomethine dye of the formula:

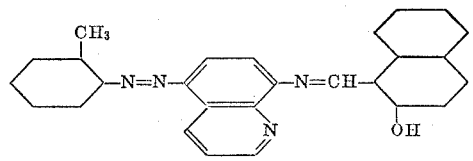

Example XVIII.—Dyeing of nickel-containing polypropylene

A commercially available nickel-containing polypropylene fabric was boiled with 1.0 weight percent of the dye of Example XVII, pasted with an alkylaryl sulfonate in an aqueous bath, and brought to pH 4–5 with acetic acid. After rinsing and drying, the fabric was found to be dyed in a full violet shade with excellent fastness to washing. The dry cleaning properties of the dyed fabric were tested by immersion of the fabric in perchloroethylene for a 36 hour period, during which time no color was removed from the fabric. The dyeing was tested for lightfastness using the conventional accelerated testing method with a carbon arc Fade-O-Meter. Only a slight break in color occurred after forty hours exposure time.

Example XIX.—Preparation of N-[2-hydroxy-5-(1-naphthylazo)-benzylidene]-8-aminoquinoline 1 - naphthylamine (14.3 g., 0.1 m.) was diazotized in the known manner and the diazo solution added slowly at 0–5° C. to a solution of 12.9 g. (0.105 m.) of salicylaldehyde, 4.2 g. (0.105 m.) of sodium hydroxide, and 37.5 g. of sodium carbonate in 750 ml. of water. The mixture was stirred for 12 hours, then filtered. The insolubles were slurried in 800 ml. of water and 8 ml. of concentrated hydrochloric acid for seven hours, filtered again, washed free of acid with water, and dried to obtain 22.0 g. (89 percent yield) of the desired intermediate.

A mixture of 12.4 g. (0.05 m.) of the above product, 7.2 g. (0.05 m.) of 8-aminoquinoline, and 100 ml. of isopropanol was stirred and refluxed for 30 hours, then cooled to 20° C. and filtered. The filter cake was dried to give 15.9 g. of N-[2 - hydroxy - 5 - (1-naphthylazo)-benzylidene]-8-aminoquinoline.

The product, applied in the usual manner, dyed nickel-containing polypropylene fiber in a reddish-orange shade.

Example XX.—Preparation of N-[2-hydroxy-5-(2-methoxy-4-nitrophenylazo)-benzylidene]-8-aminoquinoline p-Nitro-o-oanisidine (16.8 g., 0.1 m.) was diazotized in the usual manner and the diazo solution was added slowly at 0–2° C. to a solution of 12.9 g. (0.105 m.) of salicylaldehyde, 4.2 g. (0.105 m.) of sodium hydroxide, and 37.5 g. of sodium carbonate in 750 ml. of water. The mixture was stirred for several hours, then filtered. The dyestuff was reslurried in 800 ml. water and the slurry acidified with 8.0 ml. of concentrated hydrochloric acid, stirred for 12 hours, and filtered again. The insoluble product was washed well with water and dried to give 26.1 g. (87 percent yield) of the desired intermediate (p-nitro-o-anisidine→salicylaldehyde) as a brown powder.

A mixture of 15.1 g. (0.05 m.) of the above product, 7.2 g. (0.05 m.) of 8-aminoquinoline, and 100 ml. of isopropanol was stirred and refluxed for 36 hours, then cooled to 20° C. and filtered. The solid product was washed with isopropanol and dried to give 19.8 g. of N-[2 - hydroxy - 5 - (2 - methoxy-4-nitrophenylazo)benzylidene]-8-aminoquinoline.

The product, applied in the usual manner, dyed nickel-containing polypropylene fabric in a reddish shade.

We claim:

1. A complex metal compound which contains a metal selected from the group consisting of nickel and aluminum in complex combination with an azomethine compound having the formula:

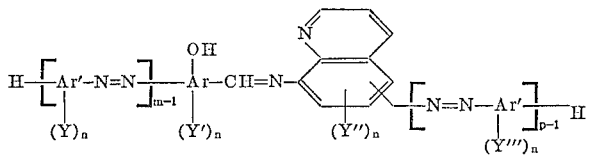

wherein Ar is a member selected from the group consisting of phenyl and naphthyl, the hydroxyl group on the Ar group being ortho- to the azomethine group, Ar' is a member selected from the group consisting of phenyl and naphthyl, $m$ is an integer having a value of 2–3, $p$ is an integer having a value of 1–3, $n$ is an integer having a value of 1–2, and Y, Y', Y'', and Y''' are members selected from the group consisting of hydrogen, lower alkyl, lower alkoxy, chloro, and trifluoromethyl.

2. A complex metal compound which contains nickel in complex combination with an azomethine compound of the formula:

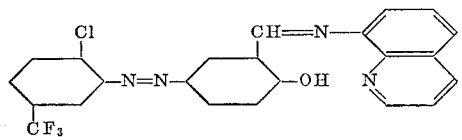

3. A complex metal compound which contains nickel in complex combination with an azomethine compound of the formula:

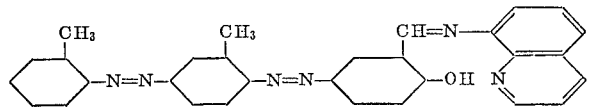

4. A complex metal compound which contains nickel in complex combination with an azomethine compound of the formula:

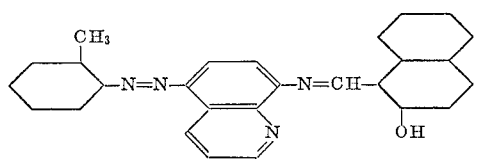

References Cited
UNITED STATES PATENTS

| | | | |
|---|---|---|---|
| 2,725,376 | 11/1955 | Brody | 260—155 |
| 2,801,996 | 8/1957 | Siegel et al. | 260—146 |
| 3,132,140 | 5/1964 | Jaffe | 260—240 |

FOREIGN PATENTS

| | | |
|---|---|---|
| 1,231,710 | 5/1960 | France. |
| 1,117,234 | 11/1961 | Germany. |

FLOYD D. HIGEL, *Primary Examiner.*